United States Patent Office 3,142,682

Patented July 28, 1964

3,142,682

TERTIARY AMINO DERIVATIVES OF CHROMANS AND HOMO-CHROMANS

George de Stevens, New Providence, N.J., assignor to Ciba Corporation, a corporation of Delaware No Drawing. Filed Nov. 21, 1961, Ser. No. 154,060
15 Claims. (Cl. 260—295)

The present invention concerns benz[b]cyclo-oxaalkane compounds, particularly those of the chroman and 2,3,4,5-tetrahydro-1-benzoxepin (homochroman) series, having the ring systems of the formulae:

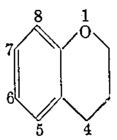

and

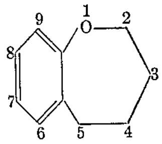

respectively. More particularly, it relates to 4-esterified hydroxy-3-tertiary amino-lower alkyl-4-R-($C_nH_{2n}$)-chromans and 5-esterified hydroxy-4-tertiary amino-lower alkyl-5-R-($C_nH_{2n}$)-2,3,4,5-tetrahydro-1-benzoxepines (or 5-esterified hydroxy-4-tertiary amino-5-R-($C_nH_{2n}$)-homochromans), in which R represents a carbocyclic aryl or a heterocyclic aryl radical, and the letter *n* stands for an integer from 0 to 2, both inclusive, salts, N-oxides, salts of N-oxides or quaternary ammonium compounds thereof, as well as process for the preparation of such compounds.

The acid portion of the esterified hydroxyl group is the radical of an organic carboxylic acid, such as an aliphatic carboxylic acid, particularly a lower alkanoic acid, e.g. acetic, propionic, butyric, pivalic acid and the like, as well as a lower alkyl carbonic acid, e.g. methyl carbonic, ethyl carbonic acid and the like, a carbamic acid, such as carbamic acid, an N-lower alkyl-carbamic acid, e.g. N-methyl-carbamic, N-ethyl-carbamic acid and the like, an N,N-di-lower alkyl-carbamic acid, e.g. N,N-dimethyl-carbamic, N,N-diethyl-carbamic acid and the like, a tertiary amino-lower alkanoic acid, e.g. N,N-dimethylamino-acetic, N,N-diethylamino-acetic, pyrrolidino-acetic, β-N,N-dimethylamino-propionic acid and the like, a lower alkoxy-lower alkanoic acid, e.g. methoxyacetic, ethoxyacetic, β-methoxy-propionic acid and the like, or any other suitable organic carboxylic acid, such as benzoic acid, lower alkoxy-benzoic acid, e.g. 4-methoxy-benzoic, 3,4,5-trimethoxy-benzoic acid and the like, piperonylic acid, phenylacetic acid, cinnamic acid and the like, or pyridine carboxylic acid, e.g. 4-pyridine carboxylic acid and the like, or any other analogous organic carboxylic acid.

The group R of the substituent R-($C_nH_{2n}$)- attached to the same carbon atom as the esterified hydroxyl group, stands for a carbocyclic aryl radical, such as monocyclic carbocyclic aryl, particularly phenyl. It may also represent substituted phenyl, such as (lower alkyl)-phenyl, e.g. 3-methyl-phenyl, 4-methyl-phenyl, 3,4-dimethyl-phenyl, 2-ethyl-phenyl, 4-ethyl-phenyl, 2-n-propyl-phenyl, 4-isopropyl-phenyl and the like, (hydroxy)-phenyl, e.g. 4-hydroxy-phenyl and the like, (etherified hydroxy)-phenyl, for example, (lower alkoxy)-phenyl, e.g. 4-methoxy-phenyl, 3,4-dimethoxy-phenyl, 2,5-dimethoxy-phenyl, 3,4,5-trimethoxy-phenyl, 2-ethoxy-phenyl, 4-n-propyloxy-phenyl, 3-isopropyloxy-phenyl and the like, (lower alkenyloxy)-phenyl, e.g. 4-allyloxy-phenyl and the like, (lower alkylenedioxy)-phenyl, e.g. 3,4-methylene-dioxy-phenyl and the like, or any other (etherified hydroxy)-phenyl group, (halogeno)-phenyl, e.g. 4-fluoro-phenyl, 3-chloro-phenyl, 4-chloro-phenyl, 3,4-dichloro-phenyl, 2,5-dichloro-phenyl, 4-bromo-phenyl, 4-iodo-phenyl and the like, (trifluoromethyl)-phenyl, e.g. 4-trifluoromethyl-phenyl and the like, nitro-phenyl, e.g. 3-nitro-phenyl, 4-nitro-phenyl and the like, amino-phenyl, such as N,N-di-lower alkyl-amino-phenyl, e.g. 3-N,N-dimethylamino-phenyl, 4-N,N-diethylamino-phenyl, and the like, or any other suitable monocyclic carbocyclic aryl group. The carbocyclic aryl portion may also be a bicyclic carbocyclic aryl group, e.g. 1-naphthyl or 2-naphthyl, or these groups substituted by lower alkyl, e.g. methyl, ethyl and the like, etherified hydroxy, for example, lower alkoxy, e.g. methoxy, ethoxy and the like, lower alkenyloxy, e.g. allyloxy and the like, or lower alkylenedioxy, e.g. methylenedioxy and the like, halogeno, e.g. fluoro, chloro, bromo and the like, trifluoromethyl, nitro, amino, such as N,N-di-lower alkylamino, e.g. N,N-dimethylamino, N,N-diethylamino and the like. The substituent R may also represent a heterocyclic aryl radical, such as a monocyclic heterocyclic aryl, primarily pyridyl, e.g. 2-pyridyl, 3-pyridyl, 4-pyridyl and the like, as well as thienyl, e.g. 2-thienyl and the like, furyl, e.g. 2-furyl and the like.

Whenever the letter *n*, representing an integer from 0 to 2, both inclusive, stands for 0, the group of the formula -($C_nH_{2n}$)- represents a direct bond between the group R and the carbon atom of the 4-position of the chroman or the carbon atom of the 5-position in the 2,3,4,5-tetrahydro-1-benzoxepine ring system. The group of the formula -($C_nH_{2n}$)- represents a lower alkylene radical whenever the letter *n* stands for one of the integers 1 and 2; these lower alkylene radicals are primarily methylene, as well as 1,1-ethylene or 1,2-ethylene.

The lower alkyl portion of the tertiary amino-lower alkyl substituent attached to the 3-position of the chroman ring system or the 4-position of the 2,3,4,5-tetrahydro-benzoxepine ring system has from one to three carbon atoms. Preferably, it represents methylene, but may also stand for 1,1-ethylene, 1,2-ethylene, 1-methyl-1,2-ethylene, 2-methyl-1,2-ethylene or 1,3-propylene and the like. The lower alkylene radical or a portion of it may also be part of a heterocyclic ring system, such as a saturated or partially saturated azacyclic ring system containing the tertiary nitrogen atom as a ring member.

The tertiary amino portion of the tertiary amino-lower alkyl substituent may be represented, for example, by N,N-di-substituted amino, in which the substituents represent, for example, aliphatic radicals, such as lower alkyl, lower alkenyl and the like, cycloaliphatic radicals, such as cycloalkyl and the like, cycloaliphatic-aliphatic radicals, such as cycloalkyl-lower alkyl and the like, carbocyclic aryl, such as monocyclic carbocyclic aryl, carbocyclic-aryl-aliphatic radicals, such as monocyclic carbocyclic aryl-lower alkyl and the like, or any other suitable substituents. These radicals have from one to ten carbon atoms, and may be represented, for example, by lower alkyl, e.g. methyl, ethyl, propyl, isopropyl, butyl, isobutyl, secondary butyl, pentyl, neopentyl and the like, lower alkenyl, e.g. allyl, methylallyl and the like, cycloalkyl having from three to eight, preferably from five to seven, ring carbon atoms, e.g. cyclopentyl, cyclohexyl and the like, cycloalkyl-lower alkyl, in which cycloalkyl has from three to eight, preferably from five to seven, ring carbon atoms, e.g. cyclopentylmethyl, 2-cyclohexylethyl, and the like, monocyclic carbocyclic aryl, e.g. phenyl and the like, monocyclic carbocyclic aryl-lower alkyl, such as phenyl-lower alkyl, e.g. benzyl, 1-phenylethyl, 2-phenylethyl and the like, or any other suitable substituent. These radicals may have additional groups as substituents; free hydroxyl, lower alkoxy, e.g. methoxy, ethoxy and the like, lower alkyl-mercapto, e.g. methylmercapto, ethylmercapto, or any other suitable group may be attached to such radicals. N,N-di-substituted amino groups are primarily represented by N,N-di-lower alkyl-amino, in which lower alkyl has from one to four carbon atoms, e.g. N,N-dimethylamino, N-methyl-N-ethylamino, N,N-diethylamino, N,N-di-n-propylamino, N,N-di-isopropylamino and the like, as well as by N-cycloalkyl-N-lower alkyl-amino, in which cycloalkyl has from five to seven ring carbon atoms and lower alkyl has from one to four carbon atoms, e.g. N-cyclopentyl-N-methyl-amino, N-cyclohexyl - N - methylamino, N-cyclohexyl-N-ethyl-amino and the like, or N-lower alkyl-N-phenyl-lower alkyl-amino, in which lower alkyl has from one to four carbon atoms, e.g. N-benzyl-N-methyl-amino, N-benzyl-N-ethyl-amino, N-methyl-N-(1-phenylethyl)-amino, N-methyl - N-(2-phenylethyl)-amino and the like, or any other N,N-di-substituted amino group. N,N-di-substituted amino groups, in which the substituents contain functional groups, are, for example, N-hydroxy-lower alkyl-N-lower alkyl-amino, e.g. N-(2-hydroxyethyl)-N-methyl-amino and the like, N,N-di-hydroxy-lower alkyl-amino, e.g. N,N-di-(2-hydroxyethyl)-amino and the like.

The tertiary amino group may also be 1-N,N-alkylene-imino, in which alkylene has from four to eight carbon atoms, 1-N,N-aza-alkylene-imino groups, in which alkylene has from four to six carbon atoms, or 1-N,N-oxa-alkylene-imino and 1-N,N-thia-alkylene-imino, in which alkylene has preferably four carbon atoms. Together with the nitrogen atoms such alkylene, aza-alkylene, oxa-alkylene or thia-alkylene radicals represent, for example, 1-N,N-alkylene-imino, in which alkylene has from four to eight carbon atoms, such as 1-pyrrolidino radicals, e.g. 1-pyrrolidino, 2-methyl-1-pyrrolidino and the like, 1-piperidino radicals, e.g. 1-piperidino, 2-methyl-1-piperidino, 4-methyl-1-piperidino, 3-hydroxy-1-piperidino, 3-acetoxy-1-piperidino, 3-hydroxymethyl-1-piperidino and the like, 1-N,N-(1,6-hexylene)-imino, 1-N,N-(1,7-heptylene)-imino, 1-N,N-(1,8-octylene)-imino and the like, 1-N,N-(aza-alkylene)-imino, in which alkylene has from four to six carbon atoms, particularly 1-N,N-(N-lower alkyl-aza-alkylene)-imino, in which alkylene has from four to six carbon atoms, such as 1-piperazino radicals, particularly 4-lower alkyl-1-piperazino, e.g. 4-methyl-1-piperazino, 4-ethyl-1-piperazino and the like, as well as 4-hydroxyethyl-1-piperazino, 4 - acetoxyethyl-1-piperazino and the like, 1-N,N-(3-aza-1,6-hexylene)-imino, particularly 1-N,N-(3-aza-3-lower alkyl-1,6-hexylene)-imino, e.g. 1-N,N-(3-aza-3-methyl-1,6-hexylene)-imino and the like, or 1-N,N-(4-aza-1,7-heptylene)-imino, particularly 1-N,N-(4-aza-4-lower alkyl-1,7- heptylene)-imino, e.g. 1-N,N-(4-aza-4-methyl-1,7-heptylene)-imino and the like, as well as 4-morpholino, 4-thiamorpholino and the like.

The tertiary amino-lower alkyl substituent may also be a heterocyclic or a heterocyclic-lower alkyl radical, in which the tertiary nitrogen atom is part of a heterocyclic nucleus. Such heterocyclic nucleus may be connected through one of its ring carbon atoms or through a lower alkylene radical, e.g. methylene, 1,2-ethylene and the like, with the 3-position of a chroman or the 4-position of a 2,3,4,5-tetrahydro-1-benzoxepine ring system. Such radicals are represented, for example, by 1-methyl-3-pyrrolidylmethyl, 1-methyl-3-piperidylmethyl, 1-methyl-4-piperidyl and the like.

The other positions of the cyclo-oxaalkane portion of the benz[b]cyclo-oxaalkane ring system, i.e. position 2 in the chroman and positions 2 and 3 in the 2,3,4,5-tetrahydro-1-benzoxepine ring systems, are unsubstituted, but may contain as substituents an aliphatic radical, particularly lower alkyl, e.g. methyl, ethyl and the like, as well as monocyclic carbocyclic aryl, e.g. phenyl and substituted phenyl (as described in detail hereinabove), or monocyclic carbocyclic aryl-lower alkyl, such as phenyl-lower alkyl, e.g. benzyl and the like, or substituted phenyl-lower alkyl.

The six-membered aromatic carbocyclic portion of the benz[b]cyclo-oxaalkane nucleus, which represents a 1,2-phenylene radical, is preferably unsubstituted. It may also have one or more than one substituent, which may be located in any of the four positions available for substitution; whenever more than one substituent is present, these may be of the same or of different nature. Substituents are primarily hydroxyl, etherified hydroxyl, such as lower alkoxy, e.g. methoxy, ethoxy and the like, lower alkenyloxy, e.g. allyloxy and the like, lower alkylenedioxy, e.g. methylenedioxy and the like, or any other etherified hydroxyl group, esterified hydroxyl, such as lower alkoxy-carbonyloxy, e.g. methoxy-carbonyloxy, ethoxy-carbonyloxy and the like, lower alkanoyloxy, e.g. acetyloxy, propionyloxy and the like, or halogeno, e.g. fluoro, chloro, bromo and the like, as well as lower alkyl, e.g. methyl, ethyl, isopropyl and the like, trifluoromethyl, etherified mercapto, such as lower alkyl-mercapto, e.g. methylmercapto, ethylmercapto and the like, nitro, amino, for example, N,N-di-substituted amino, for example, N,N-di-lower alkyl-amino, e.g. N,N-dimethylamino and the like.

Salts of the compounds of this invention are primarily pharmaceutically acceptable, non-toxic acid addition salts, such as those with inorganic acids, e.g. hydrochloric, hydrobromic, sulfuric, phosphoric, nitric acids and the like, with organic carboxylic acids, e.g. formic, acetic, propionic, pivalic, glycolic, lactic, succinic, methylsuccinic, maleic, malic, tartaric, citric, benzoic, dihydrocinnamic, cinnamic, mandelic, salicylic, 4-aminosalicylic, 2-phenoxybenzoic, 2-acetoxybenzoic, nicotinic, isonicotinic acid and the like, or with organic sulfonic acids, methane sulfonic, ethane sulfonic, ethane 1,2-disulfonic, 2-hydroxyethane sulfonic, p-toluene sulfonic acid and the like. Salts, which may be prepared primarily for identification purposes, are, for example, those with acidic organic nitro compounds, e.g. picric, picrolonic, flavianic acid and the like, or metal complex acids, e.g. phosphotungstic, phosphomolybdic, chloroplatinic, Reinecke acid and the like.

Also included within the scope of this present invention are the N-oxides of the aforementioned compounds, as well as the acid addition salts of such N-oxides.

Quaternary ammonium derivatives of the compounds of this invention are those formed with the reactive esters of alcohols and strong acids; they are represented primarily by lower alkyl, e.g. methyl, ethyl, n-propyl, isopropyl and the like, or phenyl-lower alkyl, e.g. benzyl, 1-phenylethyl, 2-phenylethyl and the like, quaternary ammonium salts, such as halides, e.g. chloride, bromide, iodide and the like, sulfates, lower alkane sulfonates, e.g. methane sulfonate, ethane sulfonate and the like, hydroxy-lower alkane sulfonates, e.g. methyl 2-hydroxyethane sulfonate and the like, monocyclic carbocyclic aryl sulfonates, e.g. p-toluene sulfonate and the like. Also included as quaternary ammonium compounds are the corresponding quaternary ammonium hydroxides, and the salts of such hydroxides with acids, particularly with the organic carboxylic acids mentioned hereinabove.

The compounds of this invention may be in the form of racemates or optically active antipodes.

The compounds of this invention may, therefore, be represented by the formulae:

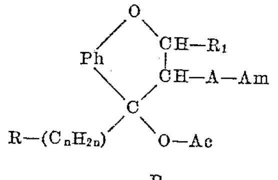

and

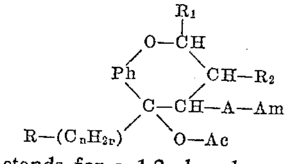

in which Ph stands for a 1,2-phenylene radical, particularly 1,2-phenylene, as well as substituted 1,2-phenylene, particularly (hydroxy)-1,2-phenylene, (etherified hydroxy)-1,2-phenylene, such as (lower alkoxy)-1,2-phenylene, (lower alkenyloxy)-1,2-phenylene, (lower alkylenedioxy)-1,2-phenylene and the like, or (esterified hydroxy)-1,2-pyenylene, such as (lower alkoxy-carbonyloxy)-1,2-phenylene, (lower alkanoyloxy)-1,2-phenylene, (halogeno)-1,2-phenylene and the like, or other substituted 1,2-phenylene radicals, such as (lower alkyl)-1,2-phenylene, (etherified mercapto)-1,2-phenylene, such as (lower alkyl-mercapto)-1,2-phenylene and the like, (nitro)-1,2-phenylene, (N,N-di-lower alkyl-amino)-1,2-phenylene and the like, the group R and the letter $n$ have the previously given meaning, Ac stands for the acyl radical of an organic carboxylic acid, A represents lower alkylene, particularly methylene, Am stands for tertiary amino as defined hereinabove, and each of the groups $R_1$ and $R_2$ stands primarily for hydrogen, but may also be one of the previously mentioned substituents, such as an aliphatic radical, particularly lower alkyl, a monocyclic carbocyclic aryl radical, particularly phenyl, or a monocyclic carbocyclic aryl-aliphatic radical, particularly phenyl-lower alkyl, salts, N-oxides, salts of the N-oxides and quaternary ammonium compounds thereof.

The compounds of this invention have analgesic properties and are used to raise the threshold of pain and alleviate, for example, light pain (e.g. toothaches, headaches and the like), severe pain (e.g. post-operative pains, pains in connection with fractures and the like) or chronic pain (e.g. pains caused by arthritic conditions and the like).

Compounds with particularly outstanding analgesic properties are those having one of the formulae:

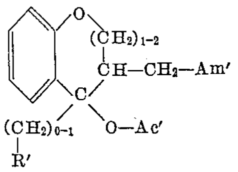

and

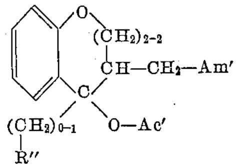

in which R' is phenyl, R'' is pyridyl, Ac' represents lower alkanoyl, e.g. acetyl, propionyl and the like, Am' is N,N-di-lower alkyl-amino, particularly N,N-dimethyl-amino, as well as N-ethyl-N-methyl-amino, N,N-diethyl-amino and the like, or pharmaceutically acceptable non-toxic acid addition salts thereof.

The new compounds of this invention may be used in the form of pharmaceutical preparations, which consist essentially of a pharmacologically effective amount of one of the new compounds in admixture with a pharmaceutical organic or inorganic, solid or liquid vehicle suitable for enteral or parenteral administration. For making up the preparations there may be used substances, which do not react with the new compounds, such as water, gelatine, lactose, starches, lactic acid, stearic acid, magnesium stearate, stearyl alcohol, talc, vegetable oils, benzyl alcohols, gums, propylene glycol, polyalkylene glycols, or any other known carrier for such preparations. These may be in solid form, for example, as capsules, tablets, dragees and the like, or in liquid form, for example, as solutions, suspensions, emulsions and the like. If desired, they may contain auxiliary substances, such as preserving, stabilizing, wetting, emulsifying agents and the like, salts for varying the osmotic pressure, buffers, etc. They may also contain, in combination, other useful substances.

The compounds of the present invention may be prepared according to known methods, for example, by converting in a 3-tertiary amino-lower alkyl-4-R-($C_nH_{2n}$)-chroman-4-ol or in a 4-tertiary amino-lower alkyl-5-R-($C_nH_{2n}$) - 2,3,4,5 - tetrahydro - 1 - benzoxepin - 5 - ol compound, in which R and the letter $n$ have the previously given meaning, or an alkali metal derivative thereof, the hydroxyl group into an esterified hydroxyl group, and, if desired, converting a resulting salt into the free compound or into another salt, and/or, if desired, converting a free compound into a salt, an N-oxide, or a quaternary ammonium compound thereof, and/or, if desired, converting an N-oxide into a salt thereof, and/or, if desired, converting a quaternary ammonium compound into another quaternary ammonium compound, and/or, if desired, separating a resulting mixture of isomers into the single isomers.

Conversion of the hydroxyl group in the starting material into an esterified hydroxyl group is carried out according to known esterification methods. For example, the alcohol starting material or an alkali metal, e.g. lithium, sodium and the like, derivative thereof is treated with the reactive functional derivative of an organic carboxylic acid. Reactive functional derivatives of organic carboxylic acids capable of forming ester groupings are primarily acid halides, particularly chlorides, as well as anhydrides of such acids.

Organic carboxylic acid halides, used as esterification reagents, are particularly acid chlorides; the acid chlorides of alkanoic acids containing from two to three carbon atoms, e.g. acetyl chloride or propionyl chloride, are the preferred lower alkanoic acid halides. These reagents are preferably used in the presence of an inert solvent, such as, for example, an aromatic hydrocarbon, e.g. benzene, toluene, xylene and the like, an aliphatic hydrocarbon, e.g. pentane, hexane and the like, an ether, e.g. diethyl ether, tetrahydrofuran and the like, or any other suitable diluent.

Acid anhydrides, particularly those of lower alkanoic acids, e.g. acetic acid anhydride or propionic acid anhydride, may be used in the absence or presence of a base, for example, a tertiary amine, such as a tri-lower alkyl-amine, e.g. N,N,N-trimethylamine, N,N-dimethyl-N-ethyl-amine, N,N-diethyl-N-methyl-amine, N,N,N-triethyl-amine, N-benzyl-N,N-dimethyl-amine, N,N-dimethyl-aniline and the like, or any equivalent organic amine, or, more especially, a heterocyclic tertiary base, e.g. pyridine, collidine and the like, or any other equivalent, particularly organic, base, as well as in the presence of an acid, for example, sulfuric, perchloric acid and the like, which is preferably used in catalytic amounts. An organic liquid base used with the esterification reagent may also serve as a diluent; any other suitable inert solvent, such as one of those mentioned hereinbefore, may be used to ensure complete solution of the esterification mixture.

Other useful esterification reagents are ketenes, such as, for example, ketene itself, methyl-ketene or other substituted ketenes, which furnish an acetyl, a propionyl radical or other substituted acetyl radicals. The reaction with a ketene is performed in an inert solvent, such as an aromatic hydrocarbon, e.g. toluene and the like.

The esterification reaction may be performed under cooling, at room temperature or at an elevated temperature, if necessary, in the atmosphere of an inert gas, e.g. nitrigen, and/or in a closed vessel.

The starting materials and the salts thereof, as well as any quaternary ammonium compounds formed therefrom, are new and are intended to be included within the scope of this invention. As previously demonstrated, they are converted into useful analgesic compounds according to the previously described procedure. The starting materials are more especially those of the formulae:

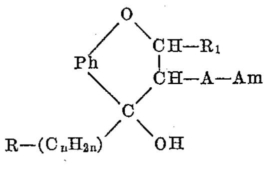

and

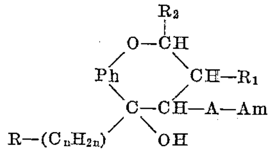

in which R, A, Am, $R_1$, $R_2$, Ph and the letter *n* have the previously given meaning, and particularly the compounds having one of the formulae:

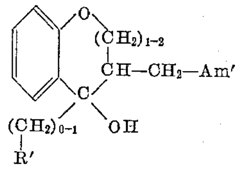

and

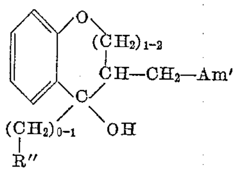

in which R′, R″ and Am′ have the previously given meaning, or the acid addition salts thereof.

The starting material may be prepared, for example, by reacting a 3-tertiary amino-lower alkyl-chroman-4-one or a 4-tertiary amino-lower alkyl-2,3,4,5-tetrahydro-1-benzoxepin-5-one compound with an R-($C_nH_{2n}$)-alkali metal compound or an R-($C_nH_{2n}$)-Grignard compound, in which R and the letter *n* have the previously given meaning, and, if desired, carrying out the previously mentioned optional steps.

An R-($C_nH_{2n}$)-alkali metal compound represents more especially an R-($C_nH_{2n}$)-lithium, as well as an R-($C_nH_{2n}$)-sodium compound, which may be prepared according to known methods. The reaction of such reagent with the ketone intermediate is preferably carried out in the presence of an inert diluent, such as, for example, an ether, e.g. diethylether, tetrahydrofuran and the like, an aromatic hydrocarbon, e.g. benzene, toluene and the like, or any other suitable solvent. Cooling may be required, but the reaction may be performed at room temperature, or, if necessary, at an elevated temperature, and is advantageously carried out in the atmosphere of an inert gas, e.g. nitrogen.

An R-($C_nH_{2n}$)-Grignard reagent is reacted with the ketone intermediate under conditions analogous to those used with the corresponding alkali metal derivatives; suitable reagents are particularly the R-($C_nH_{2n}$)-magnesium halides, e.g. R-($C_nH_{2n}$)-magnesium chloride, R-($C_nH_{2n}$)-magnesium bromide and the like, in which R and the letter *n* have the previously given meaning. A resulting Grignard complex is decomposed, for example, with water, or preferably with an aqueous solution of ammonium chloride, or any other suitable reagent.

The compounds of this invention may be obtained in the form of the salts thereof, which may be converted into the free base, for example, by treatment with an alkaline reagent, such as an alkali metal hydroxide, e.g. lithium hydroxide, sodium hydroxide, potassium hydroxide and the like, an alkali metal carbonate, e.g. sodium or potassium carbonate or hydrogen carbonate and the like, ammonia, or any other suitable alkaline reagent, as well as a hydroxyl ion exchange resin.

A resulting free compound may be converted into an acid addition salt by reacting the former with an acid, such as one of those mentioned above. The salt-forming reaction may be carried out, for example, by treating a solution of the free base in an inert solvent or solvent mixture, with the appropriate acid or a solution thereof and isolating the desired salt.

A resulting salt may be converted into another salt, for example, by treatment with a suitable anion exchange resin, or by reacting it with a suitable metal, particularly alkali metal, salt of an acid.

Salts may be obtained in the form of hemihydrates, monohydrates, sesquihydrates or polyhydrates depending on the conditions used in the formation of the salts.

N-oxides of the compounds of this invention are prepared, for example, by treating a resulting compound, preferably in an inert solvent, with an N-oxidizing reagent according to known methods. Suitable reagents are, for example, ozone, hydrogen peroxide, inorganic peracids, e.g. persulfuric acid and the like, organic persulfonic acids, e.g. p-toluene persulfonic acid and the like, or primarily organic percarboxylic acids, e.g. peracetic acid, perbenzoic acid, monoperphthalic acid and the like. The N-oxides may be obtained in the form of the free bases or the acid addition salts thereof; a free N-oxide base may be converted into its acid addition salt, or an N-oxide salt may be converted into the free N-oxide base according to the previously described procedure.

Quaternary ammonium derivatives of the compounds of this invention may be obtained, for example, by reacting the tertiary base with an ester formed by an alcohol, particularly a lower alkanol, a phenyl-lower alkanol and the like, and a strong inorganic or organic acid. Such esters are, for example, lower alkyl halides, e.g. methyl, ethyl, n-propyl or isopropyl chloride, bromide, iodide and the like, phenyl lower alkyl halides, e.g. benzyl, 1-phenylethyl or 2-phenylethyl chloride or bromide and the like, di-lower alkyl sulfates, e.g. dimethyl sulfate, diethyl sulfate and the like, lower alkyl lower alkane sulfonates, e.g. methyl or ethyl methane sulfonate or ethane sulfonate and the like, lower alkyl hydroxy-lower alkane sulfonates, e.g. methyl 2-hydroxy-ethane sulfonate, ethyl 2-hydroxy-ethane sulfonate and the like, lower alkyl monocyclic carbocyclic aryl sulfonates, e.g. methyl p-toluene sulfonate and the like, or any other analogous reactive ester reagent. The quaternizing reaction may be performed in the absence or presence of a solvent, under cooling, at room temperature or at an elevated temperature, at atmospheric pressure or in a closed vessel under pressure, and, if desired, in the atmosphere of an inert gas, e.g. nitrogen.

Resulting quaternary ammonium compounds may be converted into other quaternary ammonium compounds, such as quaternary ammonium hydroxides, for example, by reacting a quaternary ammonium halide with silver oxide, or a quaternary ammonium sulfate with barium hydroxide, by treating a quaternary ammonium salt with a hydroxyl ion exchange resin, by electrodialysis or any other suitable means. From a resulting quaternary ammonium hydroxide there may be obtained quaternary ammonium salts by reacting the base with acids, for example, those used for the preparation of acid addition salts. A quaternary ammonium compound may also be converted directly into another quaternary ammonium salt without the formation of an intermediate quaternary ammonium hydroxide; for example, a quaternary ammonium iodide may be reacted with freshly prepared silver chloride, with hydrochloric acid in anhydrous methanol, or with a suitable chloride ion exchange resin, to yield the quaternary ammonium chloride.

A resulting mixture of diastereoisomeric compounds may be separated according to known methods, for example, fractional crystallization, fractional distillation, if necessary of a derivative of the diastereoisomeric mixture.

A resulting racemate may be resolved into the optically active forms, the levo-rotatory l-form and the dextro-rotatory d-form. Such resolution procedure may be carried out according to known methods. For example, to the solution of the free base of a racemate (a d,l-compound) in a suitable solvent or solvent mixture is added one of the optically active forms of an acid, containing an asymmetric carbon atom, or a solution thereof. Especially useful as optically active forms of salt-forming acids, having the asymmetric carbon atom are the d-tartaric acid (L-tartaric acid) and the l-tartaric acid (D-tartaric acid); the optically active forms of di-benzoyl-tartaric, di-p-toluyl-tartaric, malic, mandelic, 10-camphor sulfonic acid, quinic acid and the like, may also be used. Salts formed with one of the optically active forms of the acid may then be isolated, primarily on the basis of their different solubilities. The free and optically active base may be obtained from a resulting salt according to methods used for the conversion of a salt into a base, for example, as described above. An optically active base may be converted into an acid addition salt with one of the acids mentioned hereinbefore, or may be converted into an N-oxide or a quaternary ammonium compound as described hereinbefore. Racemates may also be resolved using biochemical methods.

The invention also comprises any modification of the process wherein a compound obtainable as an intermediate at any stage of the process is used as starting material and the remaining step(s) of the process is(are) carried out. It also includes any new intermediates, which may be formed in one of the procedures outlined hereinbefore.

In the process of this invention such starting materials preferably used which lead to final products mentioned in the beginning as preferred embodiments of the invention.

This is a continuation-in-part application of my application Serial No. 107,939, filed May 5, 1961, now U.S. Patent No. 3,076,867, which in turn is a continuation-in-part application of my application Serial No. 83,874, filed January 23, 1961, now abandoned.

The following examples are intended to illustrate the invention and are not to be construed as being limitations thereon. Temperatures are given in degrees Centigrade.

*Example 1*

A solution of 1.95 g. of 3-N,N-dimethylaminomethyl-4-phenyl-chroman-4-ol in 50 ml. of toluene is added to a solution of 1.57 g. of propionyl chloride in 25 ml. of toluene. The reaction mixture is heated on the steam bath for one hour and then allowed to stand for another hour; the resulting precipitate is filtered off, washed with ether and recrystallized from hot acetone. The desired 3-N,N-dimethylaminomethyl-4-phenyl-4-propionyloxy-chroman hydrochloride of the formula:

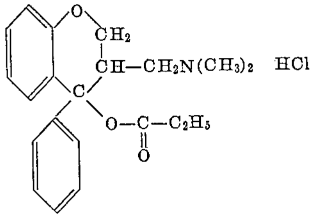

melts at 158°; an analytically pure sample melts at 164°.

The above salt may be converted into the free base by treatment with ammonia; upon treatment with perbenzoic acid, the free base yields the 3-N,N-dimethylaminomethyl-4-phenyl-4-propionyloxy-chroman N-oxide, whereas the 3-N,N-dimethylaminomethyl-4-phenyl - 4 - propionyloxy-chroman methiodide is formed by reacting the free base with methyl iodide.

The starting material may be prepared as follows: To a mixture of 15 ml. of diethyl ether and one crystal of iodine is added 0.45 g. of magnesium and a solution of 3.55 g. of bromobenzene in 25 ml. of diethyl ether; the Grignard mixture is refluxed for one hour and then cooled. A solution of 4.2 g. of 3-N,N-dimethylaminomethyl-chroman-4-one (the hydrochloride of which melts at 160–163°) in 50 ml. of diethyl ether is added slowly, and the reaction mixture is then refluxed for five hours. After standing overnight at room temperature, it is poured into dilute aqueous hydrochloric acid; the acidic layer is made basic with dilute aqueous sodium hydroxide and is extracted with diethyl ether. The organic solution is dried and evaporated; the residue is recrystallized from diethyl ether to yield the desired 3-N,N-dimethylaminomethyl-4-phenyl-chroman-4-ol of the formula:

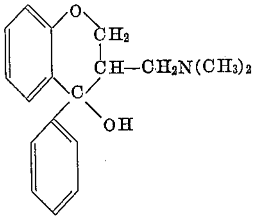

which melts at 135°. To a solution of the free base in diethyl ether is added ethanolic hydrogen chloride to yield the 3 - N,N-dimethylaminomethyl - 4 - hydroxy - 4-phenyl-chroman hydrochloride, M.P. 240–242°.

*Example 2*

A solution of 1.65 g. of 3-N,N-dimethylaminomethyl-6-methoxy-4-phenyl-chroman-4-ol in 25 ml. of toluene is added dropwise and at room temperature to a solution of 1.2 g. of propionyl chloride in 15 ml. of toluene. Stirring is continued at room temperature for two hours; the resulting precipitate is filtered off, washed with a small amount of diethyl ether and recrystallized from hot acetone. The desired 3 - N,N - dimethylaminomethyl-6-methoxy-4-phenyl-4-propionyloxy-chroman hydrochloride of the formula:

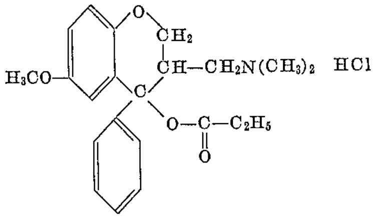

melts at 155°.

The starting material may be prepared as follows: A mixture of 7.0 g. of 6-methoxy-chroman-4-one, 1.3 g. of paraformaldehyde and 3.45 g. of dimethylamine hydrochloride in 7.5 ml. of ethanol containing two drops of hydrochloric acid is refluxed for six hours. The solution is evaporated under reduced pressure to about one-third of its original volume; the resulting crystalline precipitate is collected, washed with water and recrystallized from ethanol to yield the 3-N,N-dimethylaminomethyl - 6 - methoxy-chroman-4-one hydrochloride, M.P. 164–165°.

A Grignard reagent, prepared from 5.04 g. of bromobenzene and 0.62 g. of magnesium as described in Example 1, is reacted with a solution of 5.0 g. of 3-N.N-dimethylaminomethyl - 6-methoxy-chroman - 4-one (prepared from the hydrochloride by treatment with dilute aqueous sodium hydroxide) in diethyl ether; the desired 3-N, N-dimethylaminomethyl - 6-methoxy-4-phenyl-chroman-4-ol of the formula:

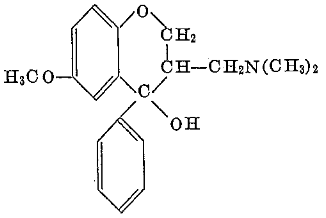

is isolated according to the procedure of Example 1 and melts at 145–147° after recrystallization from ethanol.

*Example 3*

A solution of 3.0 g. of 3-N.N-dimethylaminomethyl-4-phenyl-chroman-4-ol in toluene is added to a solution of 1.96 g. of acetyl chloride in toluene; the reaction mixture is worked up as shown in Example 1 to yield 4-acetoxy-3 - N,N-dimethylaminomethyl - 4-phenyl-chroman hydrochloride of the formula:

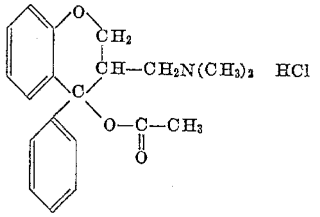

which melts at 159–160° after recrystallization from acetone.

*Example 4*

A solution of 1.7 g. of 3-N,N-dimethylaminomethyl-4-(4-methylphenyl)-chroman-4-ol in 50 ml. of toluene is added to a solution of 1.3 g. of propionyl chloride in 20 ml. of toluene. The reaction mixture is heated for one hour on the steam bath and stirred for an additional hour at room temperature. The resulting precipitate is recrystallized from acetone; the first crop is discarded, the mother liquor is concentrated to yield the desired 3-N,N-dimethylaminomethyl-4-(4-methylphenyl)-4-propionyloxy-chroman hydrochloride of the formula:

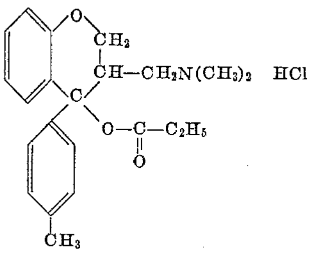

The compound melts at 158–160° after recrystallization from a mixture of acetone and diethylether.

The starting material may be prepared as follows: To a Grignard reagent prepared from 8.55 g. of 4-bromotoluene and 1.2 g. of magnesium in diethyl ether, is added 9.0 g. of 3-N,N-dimethylaminomethyl-chroman-4-one. The reaction mixture is refluxed for five hours and is then poured into dilute aqueous hydrochloric acid. The aqueous solution is made basic by adding an aqueous solution of sodium hydroxide; the organic material is extracted with diethyl ether and the organic solution is dried over magnesium sulfate. The solvent is evaporated and the crystalline residue is recrystallized from diethyl ether to yield 1.7 g. of 3-N,N-dimethylaminomethyl-4-(4-methylphenyl)-chroman-4-ol of the formula:

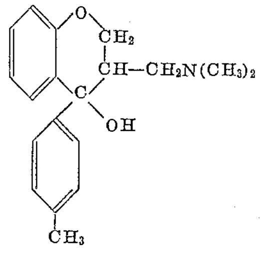

which melts at 120–122°.

*Example 5*

To a solution of 2.5 g. of 4-phenyl-3-(1-pyrrolidino)-methyl-chroman-4-ol in 50 ml. of toluene is added 1.86 g. of propionyl chloride in 20 ml. of toluene; the reaction mixture is stirred at room temperature for two hours and the resulting precipitate is filtered off. The desired 4-phenyl-4-propionyloxy - 3 - (1 - pyrrolidino) - methyl-chroman hydrochloride of the formula:

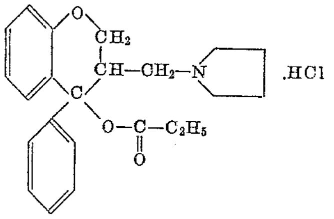

is recrystallized from a mixture of ethanol and diethyl ether, M.P. 164–165°.

The starting material may be prepared according to the method described in Example 1, i.e. by reacting the Grignard reagent prepared from 1.03 g. of magnesium and 6.72 g. of bromobenzene with 9.0 g. of 3-(1-pyrrolidino)-methyl-chroman-4-one (the hydrochloride of which melts at 158–160°). The hydrochloride of the desired 4-phenyl-3-(1-pyrrolidino)-methyl-chroman-4-ol having the formula:

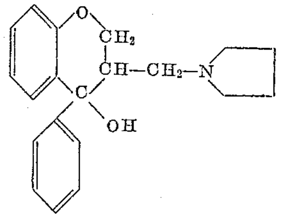

melts at 250–252°.

*Example 6*

A mixture of 1.3 g. of 4-phenyl-3-(1-piperidino)-methyl-chroman-4-ol in 25 ml. of toluene and 0.92 g. of propionyl chloride in 10 ml. of toluene is reacted as shown in Example 5 and yields 4-phenyl-3-(1-piperidino)-methyl-4-propionyloxy-chroman hydrochloride of the formula:

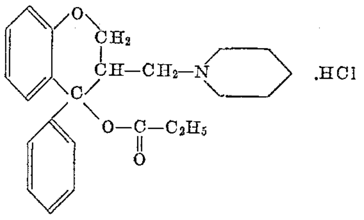

which melts at 160–162° after recrystallization from a mixture of acetone and diethyl ether.

The starting material may be prepared according to the method described in Example 1, i.e. by reacting a Grignard reagent from 0.806 g. of magnesium and 5.27 g. of bromobenzene with 7.5 g. of 3-(1-piperidino)-methyl-chroman-4-one (the hydrochloride of which melts at 165°); the hydrochloride of the resulting 4-phenyl-3-(1-piperidino)-methyl-chroman-4-ol of the formula:

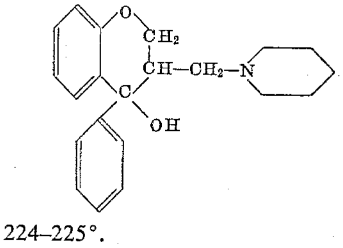

melts at 224–225°.

*Example 7*

To a solution of 1.3 g. of 4-N,N-dimethylaminomethyl-5-phenyl-2,3,4,5-tertahydro-1-benzoxepin-5-ol in 25 ml. of toluene is added 1.15 g. of propionyl chloride in 20 ml. of toluene; the reaction is carried out as described in Example 5. The desired 4-N,N-dimethylaminomethyl-5-phenyl-5-propionyloxy-2,3,4,5-tetrahydro - 1 - benzoxepine hydrochloride of the formula:

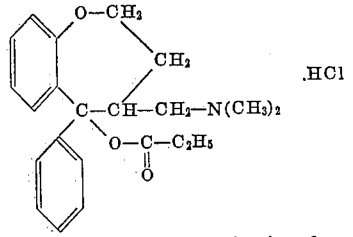

melts at 172–174° after recrystallization from a mixture of ethanol and diethyl ether.

The starting material is prepared according to the method described in Example 2: A mixture of 13.0 g. of 2,3,4,5-tetrahydro-1-benzoxepin-5-one, 7.2 g. N,N-dimethylamine hydrochloride and 2.65 g. of paraformaldehyde in 125 ml. of ethanol containing 4 drops of concentrated hydrochloric acid yields the 4-N,N-dimethylaminomethyl-2,3,4,5-tetrahydro-1-benzoxepin-5-one hydrochloride, M.P. 160–162°, which is converted into the free base. 4.0 g. of the latter is reacted with the Grignard reagent prepared from 0.456 g. of magnesium and 2.98 g. of bromobenzene to yield the 4-N,N-dimethylamino-5-phenyl - 2,3,4,5 - tetrahydro - 1 - benzoxepin - 5 - ol of the formula:

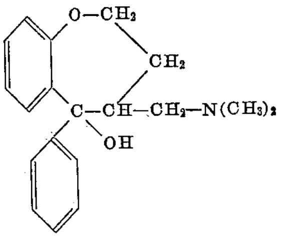

which melts at 116–117°.

*Example 8*

To a solution of 2.97 g. of 4-benzyl-3-N,N-dimethyl-amino-methyl-chroman-4-ol in toluene is added dropwise a solution of 2.32 g. of propionyl chloride in 50 ml. of toluene; the reaction mixture is heated for one hour on the steam bath and is then allowed to cool. The desired 4 - benzyl - 3-N,N-dimethylaminomethyl-4-propionyloxy-chroman hydrochloride of the formula:

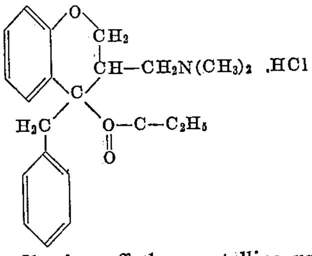

is isolated by filtering off the crystalline precipitate and recrystallizing it from acetone, M.P. 164–165°.

The starting material may be prepared as follows: To a Grignard solution, prepared from 9.25 g. of benzyl bromide and 1.29 g. of magnesium in diethylether containing one crystal of iodine, is added a solution of 10.0 g. of 4-benzyl-3-N,N-dimethyl-aminomethyl-chroman-4-ol in diethyl ether; the reaction mixture is worked up as shown in Example 1 to yield the desired 4-benzyl-3-N,N-dimethylaminomethyl-chroman-4-ol of the formula:

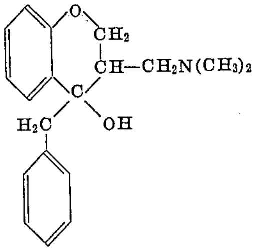

which melts at 190–192° after recrystallization from a mixture of ethanol and diethyl ether.

*Example 9*

To a mixture of 0.7 g. of lithium in 50 ml. of diethyl ether in an atmosphere of nitrogen is added 7.85 g. of bromobenzene. After stirring for two hours, 10 g. of 3 - N,N-dimethylaminomethyl-4-(2-pyridyl)-methyl-chroman-4-ol in 50 ml. of diethyl ether and then a solution of 8.6 g. of propionic acid anhydride are added, and the mixture is refluxed for twenty hours. The solid material is filtered off, the filtrate is extracted with 20 percent aqueous hydrochloric acid; the acidic solution is made basic with sodium carbonate, extracted with diethyl ether and the organic extract is dried and concentrated to yield 3.8 g. of an oily base. The latter is dissolved in acetone, a solution of 1.25 g. of maleic acid in acetone is added and the mixture is triturated several times with diethyl ether. The acetone is evaporated and a mixture of ethanol and diethyl ether is added to yield the crystalline 3 - N,N - dimethylaminomethyl - 4 - propionyloxy-4-(2-pyridyl)-methyl-chroman dimaleate of the formula:

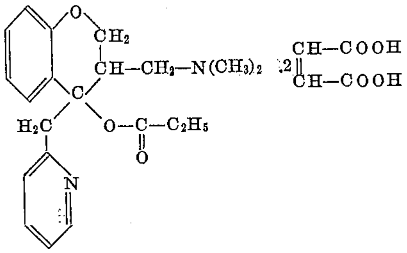

which is purified by recrystallization from a mixture of ethanol and diethyl ether, M.P. 117–118°.

The starting material may be prepared as follows: To a mixture of 4.16 g. of lithium in 150 ml. of diethyl ether under an atmosphere of nitrogen is slowly added a solution of 47 g. of bromobenzene in 100 ml. of diethyl ether while maintaining refluxing conditions. The reaction mixture is then stirred for one hour at room temperature, and a solution of 21.7 g. of apicoline in 15 ml. of diethyl ether is added over a period of 45 minutes. After stirring at room temperature for an additional three hours, 15 g. of the 3-N,N-dimethylaminomethyl-chroman-4-one in 50 ml. of diethyl ether is added, and the reaction mixture is stirred for one hour at room temperature and allowed to stand for two days. The solid material is filtered off, the filtrate is added to dilute hydrochloric acid and the organic layer is separated and discarded. The aqueous solution is made basic with sodium hydrogen carbonate, the organic material is extracted with diethyl ether, and the organic solution is dried and evaporated. The desired 3-N,N-dimethylaminomethyl-4-(2-pyridyl)-methyl-chroman-4-ol of the formula:

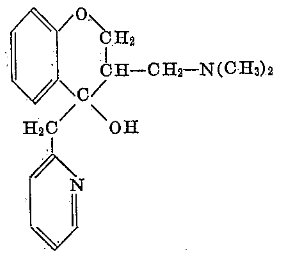

is obtained as a thick oil; its dihydrochloride melts at 220–222°.

*Example 10*

A mixture of 1.65 g. of 3-N,N-dimethylaminomethyl-8-methyl-4-phenyl-chroman-4-ol and 1.27 g. of propionyl chloride in toluene is worked up as shown in Example 1; the desired 3 - N,N - dimethylaminomethyl-8-methyl-4-phenyl-4-propionyloxy-chroman hydrochloride of the formula:

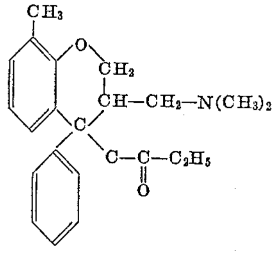

melts at 145–146° after recrystallization from a mixture of acetone and diethyl ether.

The starting material used in the above reaction is prepared as shown in Example 2; the 3-N,N-dimethylaminomethyl-8-methyl-chroman-4-one, the hydrochloride of which melts at 175–176°, is reacted with the Grignard reagent prepared from bromobenzene and magnesium to yield the desired 3-N,N-dimethylamino-methyl-8-methyl-4-phenyl-chroman-4-ol of the formula:

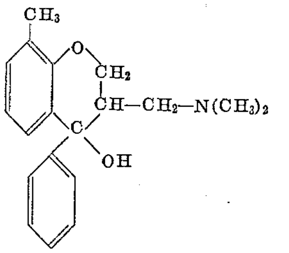

which is identified as its hydrochloride salt, M.P. 145–146°.

Other starting materials, such as, for example,

3-N,N-dimethylaminomethyl-6-methyl-4-phenyl-chroman-4-ol,
8-chloro-3-N,N-dimethylaminomethyl-4-phenyl-chroman-4-ol,
3-N,N-dimethylaminomethyl-7-methoxy-4-phenyl-chroman-4-ol,
3-N,N-diethylaminomethyl-4-phenyl-chroman-4-ol,
3-N,N-dimethylaminomethyl-4-(4-pyridyl)-chroman-1-ol,
3-N,N-dimethylaminomethyl-2-methyl-4-phenyl-chroman-1-ol.
3-N,N-di-isopropylaminomethyl-2,4-diphenyl-chroman-1-ol,
2-benzyl-3-(4-morpholino)-methyl-4-phenyl-chroman-1-ol,
5-phenyl-4-(1-pyrrolidino)-methyl-2,3,4,5-tetrahydro-1-benzoxepin-5-ol,
4-N,N-dimethylaminomethyl-5-(4-pyridyl)-methyl-2,3,4,5-tetrahydro-1-benzoxepin-5-ol and the like, or an alkali metal, e.g. lithium and the like, derivative thereof, when treated with an organic acid halide, such as, for example, propionyl chloride, as shown in the previous examples yield the 3-N,N-dimethylaminomethyl-6-methyl-4-phenyl-4-propionyloxy-chroman,
8-chloro-3-N,N-dimethylaminomethyl-4-phenyl-4-propionyloxy-chroman,
3-N,N-dimethylaminomethyl-7-methoxy-4-phenyl-4-propionyloxy-chroman,
3-N,N-diethylaminomethyl-4-phenyl-4-propionyloxy-chroman,
3-N,N-dimethylaminomethyl-4-propionyloxy-4-(4-pyridyl)-chroman,
3-N,N-dimethylaminomethyl-2-methyl-4-phenyl-4-propionyloxy-chroman,
3-N,N-di-isopropylaminomethyl-2,4-diphenyl-4-propionyloxy-chroman,
2-benzyl-3-(4-morpholino)-methyl-4-phenyl-4-propionyloxy-chroman,
5-phenyl-5-propionyloxy-4-(1-pyrrolidino)-methyl-2,3,4,5-tetrahydro-1-benzoxepine,
4-N,N-dimethylaminomethyl-5-propionyloxy-5-(4-pyridyl)-methyl-2,3,4,5-tetrahydro-1-benzoxepine and the like, and a salt, such as the hydrochloride thereof.

In the resulting compounds functional groups may be introduced or converted into other functional groups. For example, upon treatment with a suitable nitrating reagent, a nitro group may be introduced into the aromatic benz-portion of a benz[*b*]cyclo-oxaalkane compound; a resulting nitro group may be reduced into an amino group, which may be converted into other groups, for example, a halogeno atom, using the well-known Sandmeyer reaction. Or, an etherified phenolic hydroxyl group, e.g. methoxy, may be split, for example, by treatment with hydriodic acid and the like, and a free phenolic hydroxyl group may be converted into another etherified hydroxyl group or into an eesterified phenolic hydroxyl group.

What is claimed is:

1. A member selected from the group consisting of a compound having one of the formulae selected from the group consisting of

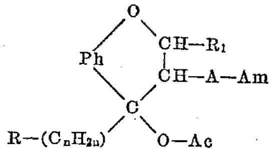

and

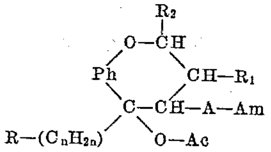

in which Ph is a member selected from the group consisting of 1,2-phenylene, (lower alkyl)-1,2-phenylene, (lower alkoxy)-1,2-phenylene and (halogeno)-1,2-phenylene, R is a member selected from the group consisting of phenyl, (lower alkyl)-phenyl and pyridyl, the letter *n* is an integer from 0 to 2, both inclusive, Ac is lower alkanoyl, A stands for lower alkylene, Am is a member selected from the group consisting of N,N-di-lower alkyl-amino, N,N-alkylene-imino in which alkylene has from four to eight carbon atoms, and morpholino, and each of the groups $R_1$ and $R_2$ is a member selected from the group consisting of hydrogen, lower alkyl, phenyl and phenyl-lower alkyl, and an acid addition salt thereof.

2. A compound of the formula:

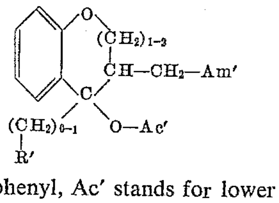

in which R′ is phenyl, Ac′ stands for lower alkanoyl and Am′ is N,N-di-lower alkyl-amino.

3. A pharmaceutically acceptable, non-toxic acid addition salt of a compound of the formula:

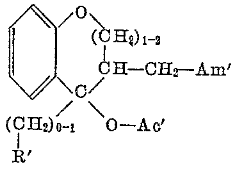

in which R′ is phenyl, Ac′ stands for lower alkanoyl, and Am′ is N,N-di-lower alkyl-amino.

4. 3-N,N - dimethylaminomethyl - 4 - phenyl-4-propionyloxy-chroman.

5. 4 - acetyloxy - 3 - N,N - dimethylaminomethyl - 4-phenyl-chroman.

6. 4 - N,N - dimethylaminomethyl - 5 - phenyl - 5-propionyloxy-2,3,4,5-tetrahydro-1-benzoxepine.

7. A compound of the formula:

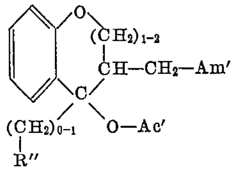

in which R″ is pyridyl, Ac′ is lower alkanoyl, and Am′ stands for N,N-di-lower alkyl-amino.

8. A pharmaceutically acceptable, non-toxic acid addition salt of a compound of the formula:

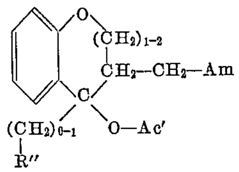

in which R″ is pyridyl, Ac′ is lower alkanoyl, and Am′ stands for N,N-di-lower alkyl-amino.

9. 3 - N,N - dimethylaminomethyl - 4 - propionyloxy-4-(2-pyridyl)-methyl-chroman.

10. A member selected from the group consisting of a compound having one of the formulae selected from the group consisting of

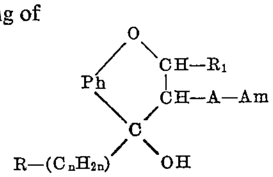

and

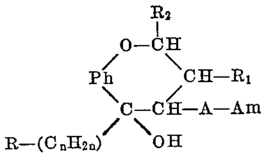

in which Ph is a member selected from the group consisting of 1,2-phenylene, (lower alkyl)-1,2-phenylene, (lower alkoxy)-1,2-phenylene and (halogeno)-1,2-phenylene, R is a member selected from the group consisting of phenyl, (lower alkyl)-phenyl and pyridyl, the letter *n* is an integer from 0 to 2, both inclusive, A stands for lower alkylene, Am is a member selected from the group consisting of N,N-di-lower alkyl-amino, N,N-alkylene-imino in which alkylene has from four to eight carbon atoms, and morpholino, and each of the groups $R_1$ and $R_2$ is a member selected from the group consisting of hydrogen, lower alkyl, phenyl and phenyl-lower alkyl, and an acid addition salt thereof.

11. A compound of the formula:

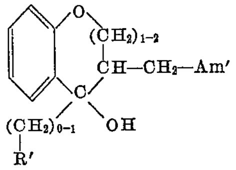

in which R′ is phenyl and Am′ is N,N-di-lower alkyl-amino.

12. 3-N,N-dimethylaminomethyl-4 - phenyl - chroman-4-ol.

13. 4-N,N-di-lower alkyl-amino-methyl-5-phenyl-2,3,4,5-tetrahydro-1-benzoxepin-5-ol.

14. A compound of the formula:

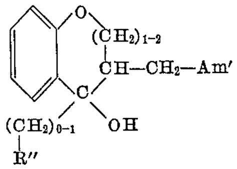

in which R″ is pyridyl and Am′ stands for N,N-di-lower alkyl-amino.

15. 3 - N,N - dimethylaminomethyl - 4 - (2 - pyridyl)-methyl-chroman-4-ol.

No references cited.